US008737769B2

(12) United States Patent
Finch et al.

(10) Patent No.: US 8,737,769 B2
(45) Date of Patent: May 27, 2014

(54) RECONSTRUCTION OF SPARSE DATA

(75) Inventors: Mark Finch, Redmond, WA (US); John Snyder, Redmond, WA (US); Hugues Hoppe, Redmond, WA (US); Yonatan Wexler, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 12/954,843

(22) Filed: Nov. 26, 2010

(65) Prior Publication Data

US 2012/0134597 A1 May 31, 2012

(51) Int. Cl.
G06K 9/32 (2006.01)
G06K 9/40 (2006.01)

(52) U.S. Cl.
USPC .......................................... 382/300; 382/261

(58) Field of Classification Search
None
See application file for complete search history.

(56) References Cited

U.S. PATENT DOCUMENTS

| | | | | |
|---|---|---|---|---|
| 4,862,373 | A * | 8/1989 | Meng | 701/423 |
| 4,972,495 | A * | 11/1990 | Blike et al. | 382/304 |
| 5,282,255 | A | 1/1994 | Bovik | |
| 5,557,719 | A * | 9/1996 | Ooka et al. | 345/441 |
| 5,625,768 | A * | 4/1997 | Dye | 345/441 |
| 5,668,888 | A * | 9/1997 | Doi et al. | 382/132 |
| 5,784,490 | A * | 7/1998 | Akra et al. | 382/215 |
| 5,867,592 | A * | 2/1999 | Sasada et al. | 382/154 |
| 6,133,921 | A | 10/2000 | Turkiyyah | |
| 6,487,304 | B1 * | 11/2002 | Szeliski | 382/107 |
| 6,919,906 | B2 | 7/2005 | Hoppe | |
| 7,151,863 | B1 * | 12/2006 | Bradley et al. | 382/299 |
| 7,230,742 | B1 * | 6/2007 | Kuwata et al. | 358/3.15 |
| 7,412,091 | B2 | 8/2008 | Hack | |
| 7,574,067 | B2 | 8/2009 | Tu | |
| 7,589,729 | B2 | 9/2009 | Skibak | |
| 7,738,725 | B2 | 6/2010 | Raskar | |
| 7,768,529 | B2 * | 8/2010 | Kuo | 345/619 |
| 8,165,394 | B2 * | 4/2012 | Cai et al. | 382/166 |
| 2002/0038201 | A1 * | 3/2002 | Balaven et al. | 703/2 |
| 2003/0086606 | A1 * | 5/2003 | Hunter et al. | 382/167 |
| 2004/0263511 | A1 * | 12/2004 | West et al. | 345/421 |
| 2006/0023933 | A1 * | 2/2006 | Mitsui | 382/145 |
| 2006/0039623 | A1 * | 2/2006 | Chaudhury et al. | 382/266 |

(Continued)

OTHER PUBLICATIONS

Free-form Object Reconstruction from Silhouettes, Occluding Edges and Texture Edges: A Unified and Robust Operator based on Duality—Published Date: Mar. 28, 2007.

(Continued)

*Primary Examiner* — Michelle Entezari
(74) *Attorney, Agent, or Firm* — Steve Wight; Carole Boelitz; Micky Minhas (57) ABSTRACT

A dense guide image or signal is used to inform the reconstruction of a target image from a sparse set of target points. The guide image and the set of target points are assumed to be derived from a same real world subject or scene. Potential discontinuities (e.g., tears, edges, gaps, etc.) are first detected in the guide image. The potential discontinuities may be borders of Voronoi regions, perhaps computed using a distance in data space (e.g., color space). The discontinuities and sparse set of points are used to reconstruct the target image. Specifically, pixels of the target image may be interpolated smoothly between neighboring target points, but where neighboring target points are separated by a discontinuity, the interpolation may jump abruptly (e.g., by adjusting or influencing relaxation) at the discontinuity. The target points may be used to select only a subset of the discontinuities to be used during reconstruction.

20 Claims, 9 Drawing Sheets

(56) References Cited

U.S. PATENT DOCUMENTS

| | | | |
|---|---|---|---|
| 2006/0104505 A1* | 5/2006 | Chen et al. | 382/162 |
| 2007/0103485 A1* | 5/2007 | Lu et al. | 345/606 |
| 2008/0008369 A1* | 1/2008 | Koptenko et al. | 382/128 |
| 2008/0036760 A1* | 2/2008 | Smith et al. | 345/419 |
| 2008/0152262 A1* | 6/2008 | Izawa et al. | 382/300 |
| 2008/0219509 A1* | 9/2008 | White et al. | 382/107 |
| 2008/0239145 A1* | 10/2008 | Kimura | 348/448 |
| 2008/0240559 A1* | 10/2008 | Malvar | 382/167 |
| 2009/0066821 A1* | 3/2009 | Achong et al. | 348/273 |
| 2009/0074328 A1* | 3/2009 | Matsumoto et al. | 382/300 |
| 2009/0180713 A1* | 7/2009 | Bucha et al. | 382/300 |
| 2009/0295934 A1* | 12/2009 | Au et al. | 348/222.1 |
| 2010/0141774 A1* | 6/2010 | Keyhl | 348/180 |
| 2011/0032269 A1* | 2/2011 | Lukac et al. | 345/606 |
| 2011/0032396 A1* | 2/2011 | Park et al. | 348/273 |

OTHER PUBLICATIONS

Real-Time Rendering of Real World Environments—Published Date: 1999.

Efficient Sparse 3D Reconstruction by Space Sweeping—Published Date: Jun. 16, 2006.

The Impact of Dense Range Data on Computer Graphics—Published Date: 1999.

* cited by examiner

RECONSTRUCTION OF SPARSE DATA

BACKGROUND

In the field of computer graphics, given a relatively sparse set of points in two dimensions, it may be desirable to reconstruct a dense target image. For example, the points may have depth values or some other type scalar data. To reconstruct an image, depths (or other types of data) in spaces between the sparse points can be interpolated based on the values of the sparse points. Typically, for two nearby points, a line between the two points will have a smooth gradation of depths. For example, if point P has a depth of 0 and point Q has a depth of 10, at four uniformly spaced points on a line between P and Q, depths might be 2, 4, 6, and 8. Generally, values interpolated between points vary smoothly.

While different interpolation strategies have been used, it has not previously been possible to use a dense image or signal to inform the interpolation process. Techniques related to reconstructing an image by taking into account features of a dense image or guide signal are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A dense guide image or signal is used to inform the reconstruction of a target image from a sparse set of target points. The guide image and the set of target points are assumed to be derived from a same real world subject or scene. Potential discontinuities (e.g., tears, edges, gaps, etc.) are first detected in the guide image. The potential discontinuities may be borders of Voronoi regions, perhaps computed using a distance in data space (e.g., color space). The discontinuities and sparse set of points are used to reconstruct the target image. Specifically, pixels of the target image may be interpolated smoothly between neighboring target points, but where neighboring target points are separated by a discontinuity, the interpolation may jump abruptly at the discontinuity, e.g., by adjusting or influencing relaxation, or specifically, by eliminating smoothness penalties. The target points may be used to select only a subset of the discontinuities to be used during reconstruction.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to using a dense guide image to inform the reconstruction of an image from a corresponding sparse set of data points. Discussion will begin with an explanation of steps of a general embodiment. Variations and details for implementing the steps of the general embodiment will then be described. An example illustrated with actual data will then be discussed.

Figure 1:
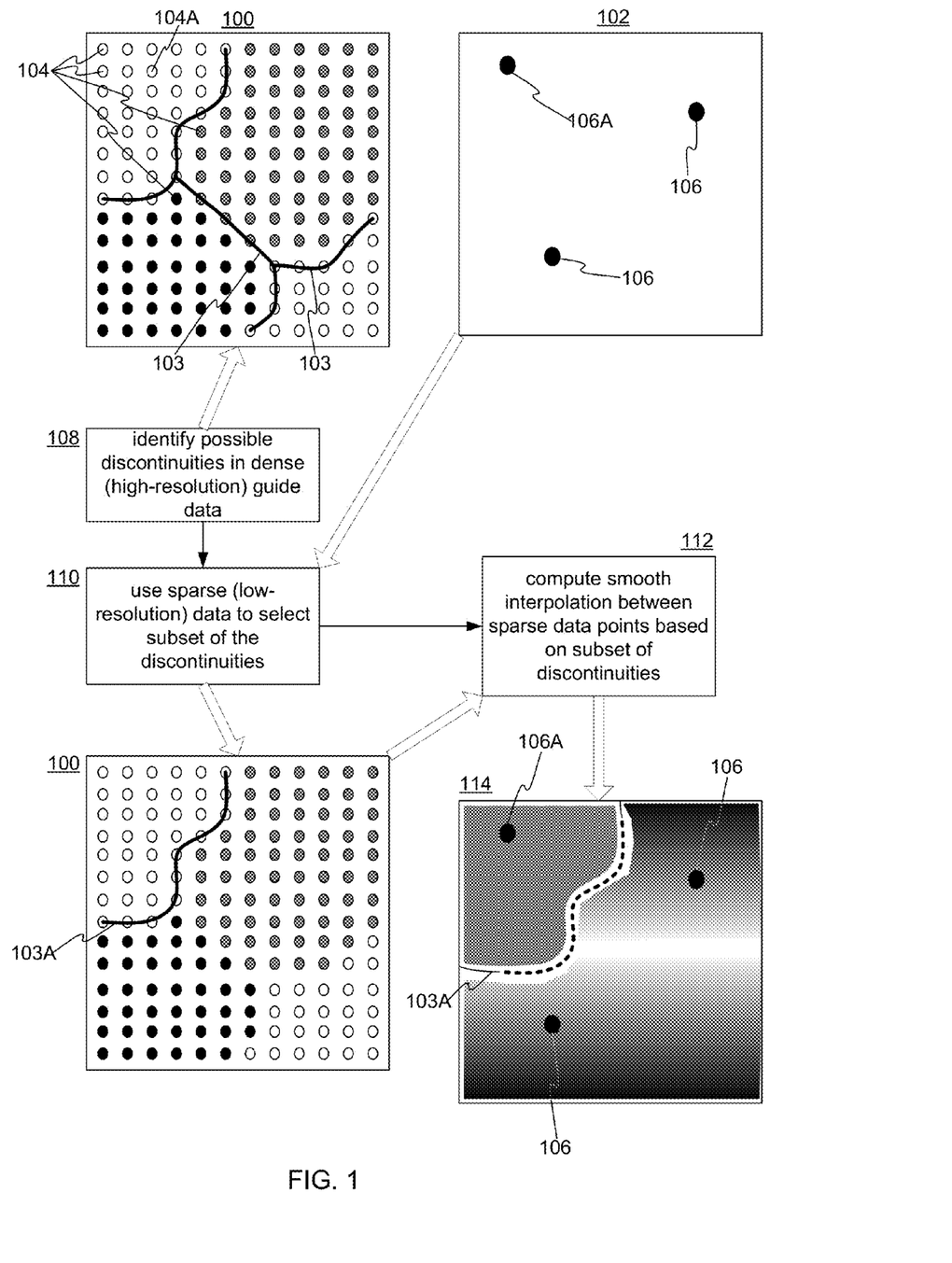
FIG. 1 shows a general process with example data.

FIG. 1 shows a general process with example data. Input data in form of a guide image 100 and a set of target points 102 will be assumed. Lines 103 and line 103A, discussed further below, represent later-identified potential discontinuities and are not part of the guide image 100. To aid understanding, an example source of input data will be described in the next paragraph. However, it should be understood the guide image 100 and target points 102 can have any source. Moreover, techniques described herein may be helpful when the guide image 100 is dense relative to the target points; however, this is not required for application of the techniques. The techniques described herein do not depend on the source or semantic content of the input data. Furthermore, the input data need not even be based on or originate from actual photographic or captured data. For example, the input data can be completely or partly synthetic, artificially rendered, etc.

Regarding the example input source, recently there have been advances in the three-dimensional reconstruction of a scene from a collection of two-dimensional photos of the scene (i.e., different photos of the scene). The photos may be automatically arranged in three-dimensions in a way that reflects the vantage points from which the photos were taken (e.g., a set of planar rectangles in three dimensions, each rectangle comprising a corresponding photo). In such a case, points on or projected from such photos (points in three-dimensional space) may form a set of sparse data points, each having a depth and location. The points may correspond to physical features of the scene as depicted in the photos (e.g., an object, an object edge, a shadow edge, a feature point of an object, etc.). A set of such points may serve as the target points 102. Moreover, one of such photos or a synthetic combination thereof may serve as the guide image 100. In short, for example only, the guide image 100 may be captured image data of a real world object or scene, and some of the data points 100 may correspond to some features of the real world object or scene. Given this data, it may be desirable to reconstruct an image, for example a depth map, from the data points 100 in a way that reflects or takes into account the guide image 100, and in particular possible discontinuities detected therein.

Regardless of origin, the guide image 100 may be dense relative to the target points 102. The target points 102 may be thought of as initial points in the final image to be reconstructed. The guide image 100 may include a set of two-dimensional guide points 104, for example, pixels or points in a color image or a depth map. The target points 102 are assumed to match the guide image 100 given as input, in the sense that image locations of these two spaces correspond even though the actual values comprising the sets of data may differ in type, nature, and even in the number of channels or dimensionality. In other words, the space of the target points 102 may map, as by various transformations (translations, rotations, distortions), to the space of the guide image 100, yet the actual image data of the two inputs may differ in type (e.g., color vs. depth), dimensionality, etc. Given a target point 106A, there may be a pixel or point 104A in the guide image 100 that roughly corresponds to a same real world point in the subject scene or as the target point 106A. Thus, discontinuities such as abrupt changes in scalar values of the guide image 100 (e.g., depth color, gradient, etc.), perhaps representing physical edges or creases, can indicate corresponding discontinuities in the target image to be reconstructed from the target points 102. Discovery and use of such discontinuities are discussed next.

Given input data in the form of guide image 100 and target points 102, at step 108 potential or candidate discontinuities, represented by lines 103, are identified in the guide image 100. Any of various forms of analysis may be used to identify potential discontinuities, including manual identification by a user. For example, discontinuities may be found by analyzing rates of change over values of the guide points 104, by identifying guide points 104 that have a value above a ceiling threshold or below a floor threshold, etc. In an embodiment discussed below with reference to FIG. 2, candidate discontinuities are edges of regions computed based on distance in guide image space between the guide points 104 and the guide points 104. For instance, in color space, color distance may be used.

Given the candidate discontinuities, represented by lines 103 and 103A, step 110 may involve using the relatively sparse target points 102 to select a subset of the discontinuities identified at step 108. The target points 102 may help identify discontinuities in various ways. In one embodiment, the relationship between values of the target signal at the two primary target points, and target points nearby, provide a basis for deciding whether a discontinuity in the guide signal should also be interpreted as a discontinuity in the target signal. Not every guide signal discontinuity implies a target discontinuity, so this verification step is performed using target signal values. In another embodiment, measures are computed for differences in signal values of the dense guide image across a candidate discontinuity curve (e.g. the difference between adjacent pixels to the left and right of the curve). For example, one can integrate, along the curve, the squared difference of the signal values measured at each curve point. A candidate discontinuity curve is then selected if and only if this integrated measure is above a threshold. Another approach is to simply measure differences in values between the target points, and use the differences as a basis for selection.

To further explain the relationship between guide signal (guide image) discontinuities and reconstructed or target discontinuities, consider that to be conservative when identifying discontinuities, it may help to favor smooth interpolation unless there is strong evidence in the data for a "true" discontinuity. A discontinuity in the guide signal by itself might not be strong enough evidence for a target discontinuity. Instead, a "true" discontinuity can mean that (1) there is a discontinuity indicated in the guide signal (based on the Voronoi boundary computation described herein, which when computed on the basis of guide signal distance tends to align itself with guide signal discontinuities, or other methods), and (2) the values of target points near this potential discontinuity confirm the existence of this discontinuity in the target space (based on the slab test described herein, or otherwise). In practice, guide signal discontinuities commonly do not indicate target discontinuities. For example, a perfectly flat wall can have color discontinuities just from painted stripes, yet clearly the flat surface of the wall has no geometric discontinuities.

In an embodiment discussed below with reference to FIG. 4, planes or slabs computed through neighboring regions (or seeds thereof) are analyzed to select the subset of candidate discontinuities to be used. The output of step 110 is a subset of the candidate discontinuities, one of which is represented by line 103A.

At step 112, the selected discontinuities are used to reconstruct a dense target signal or image 114. In one embodiment, smooth interpolation between the target points 106 is informed by the discontinuities selected at step 110, e.g., the discontinuity represented by line 103A. Note that in example image 114, the data generated between the two points 106 shows a gradual change in value (here, in the form of intensity) as any type of unconstrained interpolation might produce. Note further that where a discontinuity (line 103A) has been used to inform the reconstruction, abrupt changes in value (e.g., intensity) occur between point 106A and either of points 106. That is, a region containing points 106 may be interpolated to have smoothly changing values (e.g., depth, color, etc.), whereas a region containing a point 106A may have values, going toward points 106, change abruptly at or near the discontinuity represented by line 103A.

Figure 2:
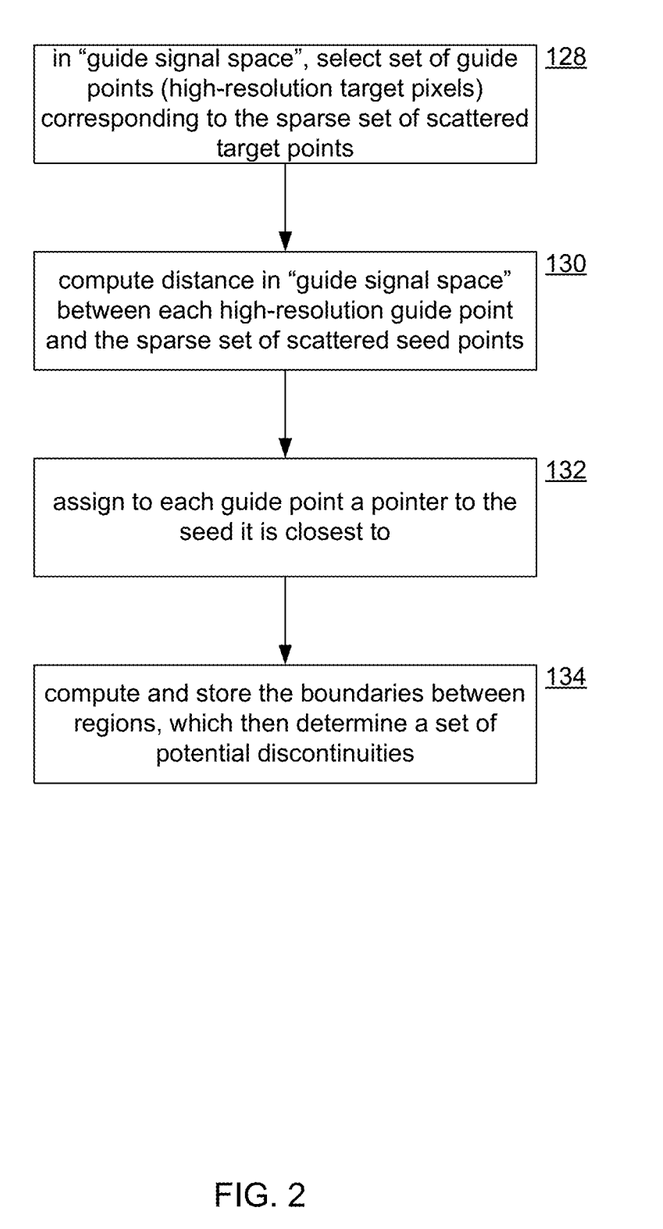
FIG. 2 shows a process for finding candidate discontinuities.

FIG. 2 shows a process for finding candidate discontinuities. Generally, the process involves computing Voronoi regions for the target points 102, and the edges of the regions are used as the candidate discontinuities. Note that a Voronoi region is a region containing all the points "closest" to a given point (closeness can be measured in ways other than geometric distance). Initially, at step 128, seed points are selected among the guide points 104. Each seed point is selected based on its correspondence to one of the target points 106 (including point 106A). That is, the seed points are guide-space equivalents of corresponding target points 106. For example, a seed point is selected at guide point 104A, which corresponds to target point 106A. In another embodiment, seed points are selected as needed rather than all at one time.

At step 130, distance in the guide signal space is computed between each seed point and guide points 104 in its vicinity. The distance is measured with respect to integrated change in the high-resolution guide signal. Each seed thus determines a region of pixels or guide points, which is referred to as a generalized Voronoi region. Each generalized Voronoi region contains the pixels or guide points that are closest to the seed for that region. These regions may be thought of as "generalized" because distance is determined by integrated change in the guide signal (changes over the values of the guide points) rather than simple spatial distance. Nonetheless, any form of distance computation may be used with varying effectiveness. For ease of computation, at step 132, the regions are kept by assigning to each guide point a pointer to the seed to which it is "closest". Based on the memberships of the regions, at step 134, the boundaries of the regions are computed and stored. For example, a boundary point may be identified as any point with a neighbor point that belongs to another region, and boundaries may be readily derived from these boundary points.

Regarding distance used for finding generalized Voronoi regions, in one embodiment, a formula can be obtained by first defining a distance (using sum of squares of differences) between neighboring pixels based on differences in the red, green, and blue channels (or whatever the data values comprise). Given a distance between neighbors, a distance between any two points can be found by integrating distances along the shortest path between these two points. Here, the shortest path is in terms of the integrated color differences, not spatial distances. For additional information, see the multi-pass method discussed in "Euclidean distance mapping" (Danielsson, Computer Graphics and Image Processing (CGIP) 1980). See also "Distance Transformations: Fast Algorithms and Applications to Medical Image Processing" (Olivier Cuisenaire, Ph.D. Thesis, 1999).

To explain further, for any path in the guide image, a distance metric can be defined that is based not simply on the length of the path in the image, but is also based on the values of the image along the path. For example, the traditional Euclidean length of the path can be defined or approximated by the sum of the distances between adjacent pixels along the path. Instead, however, it may be more effective to define the "guide signal distance" to be the sum of the absolute differences in guide pixel values between adjacent pixels along the path. Therefore, a path in a low-variation region of the guide image will have a small distance measure, whereas a path that crosses a discontinuity or high-variation detail will have a large distance measure. A "traditional" Voronoi region is defined as the subset of pixels that are closest to the seed of that region, whereby closeness is measured by the minimum length of the Euclidean path between each pixel and the seed. A "generalized" Voronoi region is defined similarly, but using a more general path distance. In particular, path distance can be based on integrated change. The precise formula for this "guide signal distance" can vary. For example, it can be based on squared difference rather than absolute difference. It could also involve pre-smoothing the guide image to remove unwanted noise.

Figure 3:
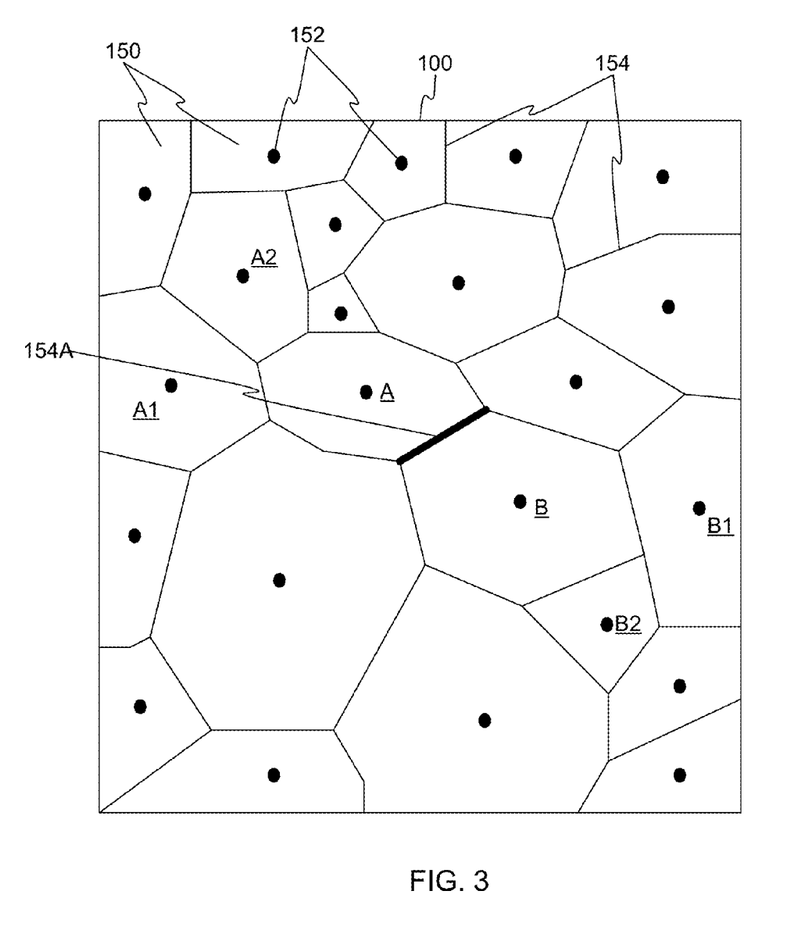
FIG. 3 shows an example of computed regions and seeds.

FIG. 3 shows an example of computed regions 150 and seeds 152. Not shown are the individual guide points of guide image 100 that are contained in each region 150. The candidate discontinuities are the boundaries 154 of the regions 150. However computed, given candidate discontinuity lines in the form of boundaries 154, a subset of the boundaries 154 is determined using a process described next. As used herein, "discontinuity", "discontinuity line", "discontinuity curve", etc., refer to lines of any shape or form (irregularly curved, somewhat straight, etc.), as may represent thin edges, tears, creases, or other demarcation features in an image.

Figure 4:
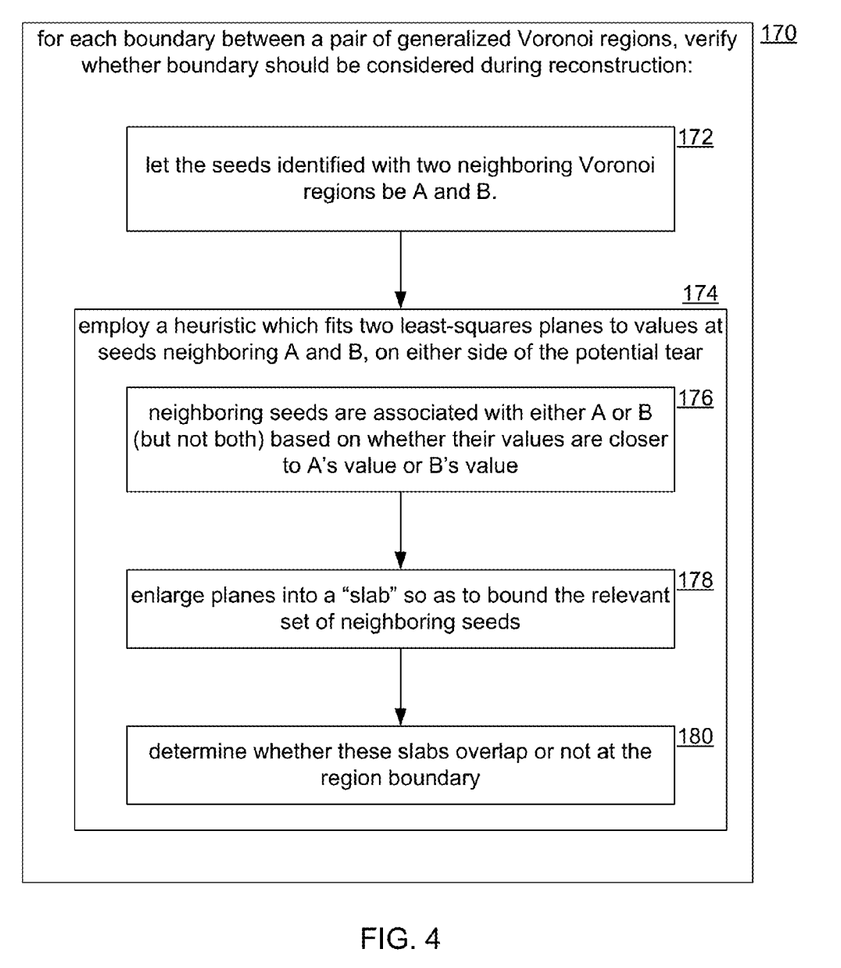
FIG. 4 shows a process for filtering candidate discontinuities.

FIG. 4 shows a process for filtering candidate discontinuities. A main loop 170 may iterate over the boundaries 154 of the regions 150. That is, for each boundary between a pair of regions, steps 172 to 180 are used to determine if the boundary will be selected for use during reconstruction. At step 172, the seeds of the two current regions are deemed to be points A and B. Step 174 is a heuristic which fits two least-squares planes to values at neighbor seeds that neighbor A and B, on either side of the current boundary (potential discontinuity) being analyzed. For example, referring to seeds A and B in FIG. 3, if boundary 154A (FIG. 4) is under consideration, then neighbors A1, A2, B1, and B2 might be used. Specifically, at step 176, neighboring seeds are associated with either A or B based on proximity of their values to the values of A and B. At step 178, planes containing these points, for example, a plane defined by A, A1, B1, are enlarged as slabs, which bound the relevant neighboring seeds. A thin slab may indicate agreement among neighbors with the plane approximation, while a thick slab may indicate large error and lack of agreement. At step 180, the slabs are analyzed to determine if they overlap at the current boundary. Lack of overlap indicates that the corresponding boundary is considered a geometric discontinuity (e.g., a tear). That is, a discontinuity is indicated because the boundary aligns with a guide signal discontinuity and because seed values on either side confirm a gap or other discontinuity which should not be smoothed over when interpolating between the target points 106 that correspond to the seeds A and B.

To elaborate on the selection of boundaries (potential discontinuities), the mentioned slabs are bounds or approximations for reconstructed values in neighborhoods (e.g., sets of Voronoi regions) on either side of a potential discontinuity. The slabs or bounded planes are based on values at the target points. Specifically, given a potential discontinuity, on one side of the potential discontinuity two parallel planes (a slab) are constructed (separated by some thickness) which contain all the target point values on that side of the given potential discontinuity. The same operation is performed for the other side of the potential discontinuity. The slabs are then examined to see if they intersect each other, when evaluated at each point on the potential discontinuity. If the two slabs are disjoint (do not overlap) at a sufficient number of points along the potential discontinuity, the boundary is interpreted as an actual discontinuity, that is, values across it are not interpolated during relaxation. If the slabs overlap at most points, then the boundary is not considered to be a discontinuity. In sum, a slab can be used to analyze the neighborhood of a discontinuity. Additionally, whether to interpret a boundary as an actual discontinuity can be based on target points of the regions near the boundary. Finally the target points can be used to determine which side of a potential discontinuity target points are on. Referring to target points of the immediately adjacent regions as primary target points, and the target points of other regions in the neighborhood as secondary target points, which side a target point is on is determined based on which of the two primary target points its value is closest to.

When computing the least squares planes and subsequent slabs to evaluate potential discontinuities of a given generalized Voronoi region, it is possible to use different depths or extents of neighboring Voronoi regions (the regions to whose seed points the planes and slabs will be fitted). In addition to the given Voronoi region, immediate neighbors may be used (a "1-ring" area), or also neighbors of neighbors may be used (a "2-ring" area), etc. Empirical tests suggest that a two-ring neighborhood may more often produce superior results. An example process for performing such a reconstruction is described next.

Figure 5:
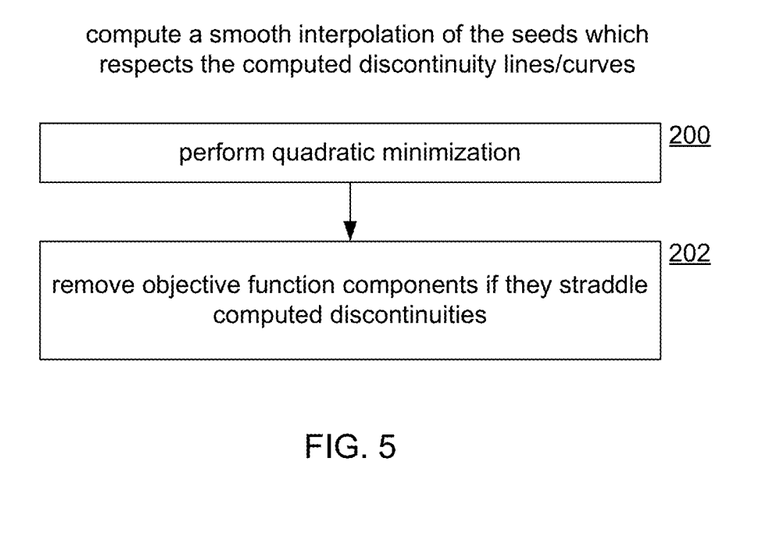
FIG. 5 shows a process for computing a smooth interpolation of the seeds or target points.

FIG. 5 shows a process for computing a smooth interpolation of the seeds or target points 106. The process is informed by—and respects—discontinuities in the form of the boundary lines/curves identified as discussed above. While any number of constrainable interpolation algorithms may be used, in one embodiment, at step 200, quadratic minimization is performed, which penalizes various measures of lack of smoothness and represents the discrete solution to a partial differential equation (PDE) (e.g., Laplacian or biLaplacian). At step 202, objective function components are removed if they straddle the selected discontinuities. This approach may produce a smooth, artifact-free interpolation of seed values everywhere except over the discontinuities. Note that quadratic minimization is merely one of many possible methods of posing these continuous partial differential equations (or more generally, posing global relaxation) once they are discretized. The solution can be found by solving a (sparse) linear system. Note also that relaxation adjustment may involve eliminating smoothness penalties that straddle a discontinuity and then performing a different global relaxation than would have performed if there were no discontinuity. But, the relaxation itself is preferably global, and takes into account the smoothness penalties (with some removed due to discontinuities) across the whole image to be reconstructed (the image may, however, a sub-part of a larger image).

Another embodiment for reconstruction by interpolation is now explained. In this embodiment, to be referred to as global relaxation with discontinuities, a target signal (image) is reconstructed while accounting for implicit discontinuities detected in a guide signal (image). The technique may be used regardless of uniformity of sampling of the target signal, and with no required minimum sampling resolution. That is, no assumptions about the target sampling density are needed, and the target signal can be completely irregular and given by even a short list of <x,y,value> triples. Moreover, the interpolation with relaxation may be global, for example, based on a global 2D PDE, such as the Laplacian or biLaplacian, which may involve multiple passes over the entire image until the relaxation result begins to converge.

Moreover, as discussed above, discontinuities can be detected before interpolation, and then target samples can be relaxed in the presence of those discontinuities. Specifically, a smoothness penalty is made that defines the PDE everywhere, but removes it at the discontinuities. Then, relaxation occurs starting from the target points, which become point constraints in the relaxation. Note that while local discontinuity detection during relaxation may be possible, detecting discontinuities globally (such as with the Voronoi boundary technique) is likely to be more robust. For example, a two-stage detect-and-filter process can be used where the guide signal is analyzed to detect candidate discontinuities, and those candidate discontinuities can be further analyzed to eliminate less likely candidates (e.g., using the slab test described herein).

Figure 6:
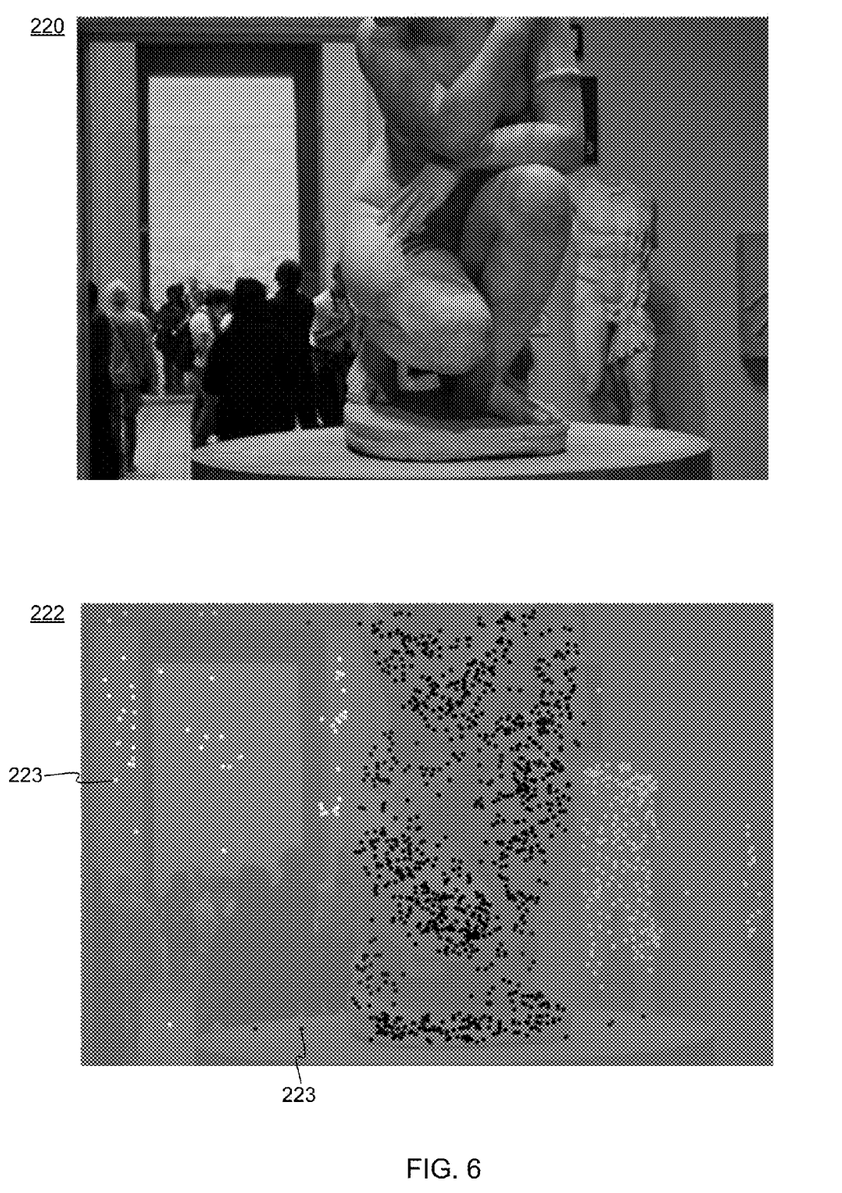
FIG. 6 shows an example guide image and an example set of target pixels.

An example will now be discussed, with reference to FIGS. 6, 7, and 8, which show actual input and results from an implementation of techniques described herein. FIG. 6 shows an example guide image 220 and an example set of target pixels 222. Although the guide image 220 is shown in black and white, in practice the guide image 220 is a color photograph; each guide pixel in the guide image 220 has photographic image data in the form of an RGB (red, green, blue) value, for example. The example target pixels 222 are shown with some imagery to highlight their spatial relationship with the subject matter (scene or object) shown in the guide image 220. However, in practice the target pixels 222 include only an initial set of pixels with two-dimensional locations in (or mapped to) the target image to be reconstructed (see target image 240 in FIG. 8), and with respective depths as projected from a viewpoint. In FIG. 6, individual target pixels 223 are shown with lightness/darkness proportional to farness/nearness relative to the viewpoint.

Figure 7:
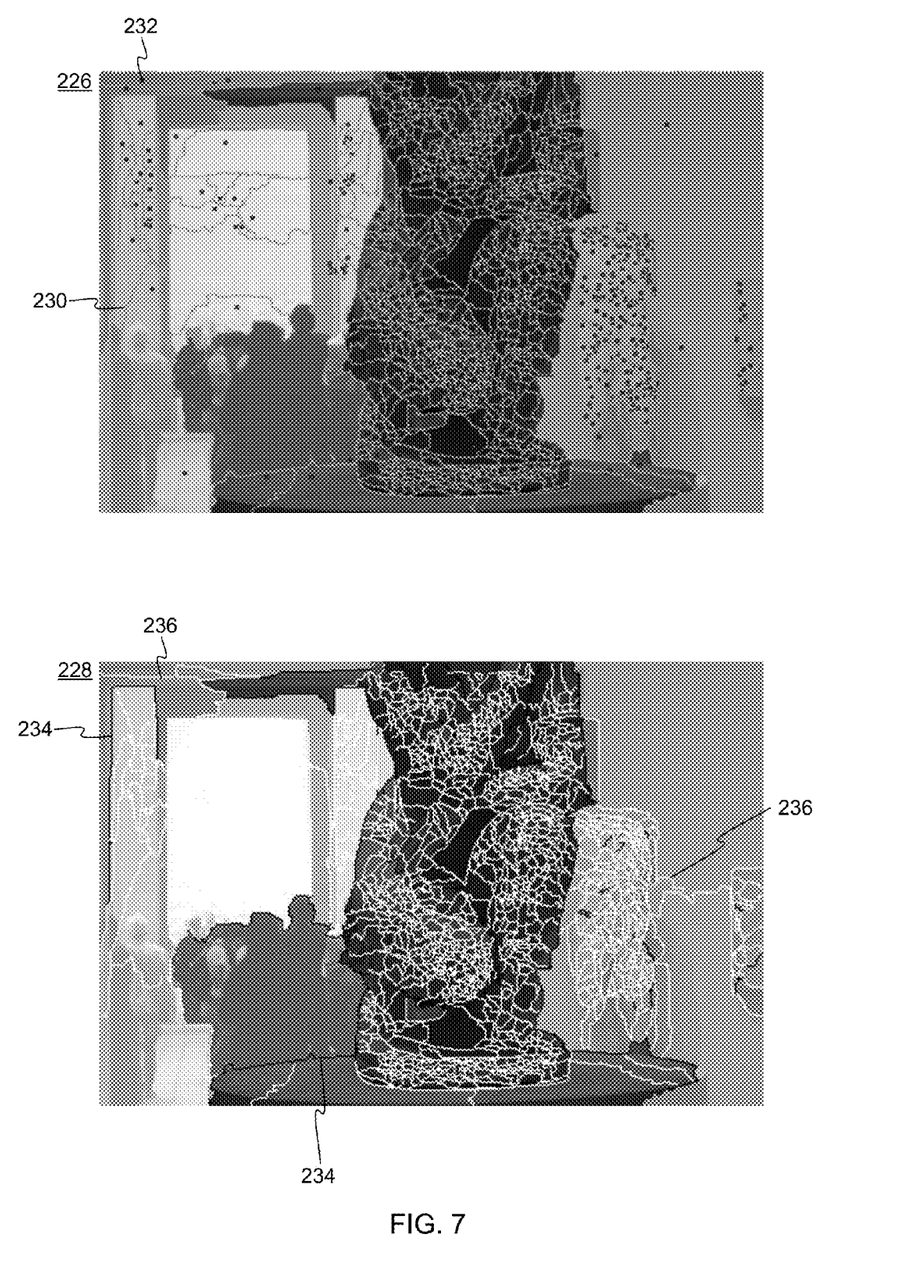
FIG. 7 shows an example set of candidate discontinuities and a selected subset of discontinuities.

FIG. 7 shows an example set of candidate discontinuities 226 and a selected subset 228 of discontinuities. In one embodiment, the candidate discontinuities 226 are Voronoi boundaries 230 as discussed above, with corresponding Voronoi regions around seeds 232, which are guide pixels that correspond to the target pixels 223. The candidate discontinuities 226 are analyzed in any number of ways mentioned above, for example by fitting slabs/planes through the seeds 232, to identify the subset 228 of discontinuities. In FIG. 7, selected discontinuities 234 are shown as dark lines, and the other unselected discontinuities 236 are shown as light lines. Note that selected discontinuities 234 may be "tears" in the scene (edges of objects), creases or crests in the shape of an object, points, gaps in the scene, and other geometric features where it would be inaccurate to completely smooth over during interpolation.

Figure 8:
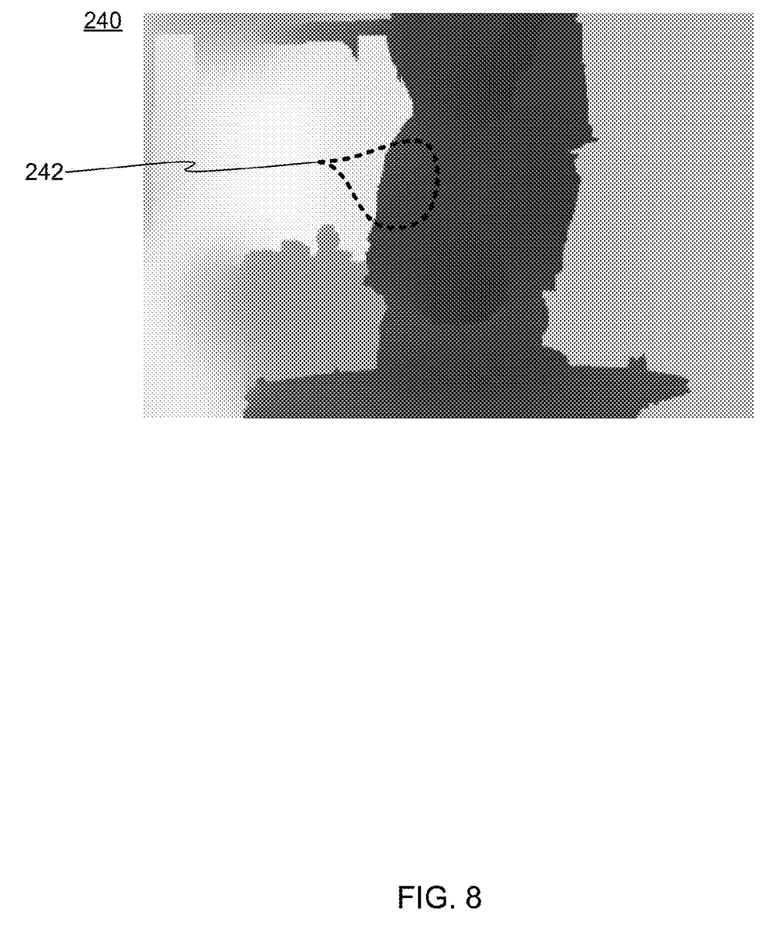
FIG. 8 shows a final reconstructed target image.

FIG. 8 shows a final reconstructed target image 240. The target image 240 is the result of interpolating from the values and locations of the target pixels 223, while at the same time respecting the selected discontinuities 234. For example, by relaxing the interpolation near the selected discontinuities 234, interpolation near a discontinuity may be smooth in the direction of nearby target pixels 223 and yet may be abrupt across the discontinuity. For example, interpolated depths at a location corresponding to the edge of a statue may vary smoothly along the statue area and up to the edge of the statue, and then may deepen abruptly as an edge (discontinuity) of the statue is crossed; the deeper interpolated values of a background object vary smoothly away from the edge. For example, see region 242 in FIG. 8, where target image 240 is a depth map and depth is shown with brightness.

CONCLUSION

Figure 9:
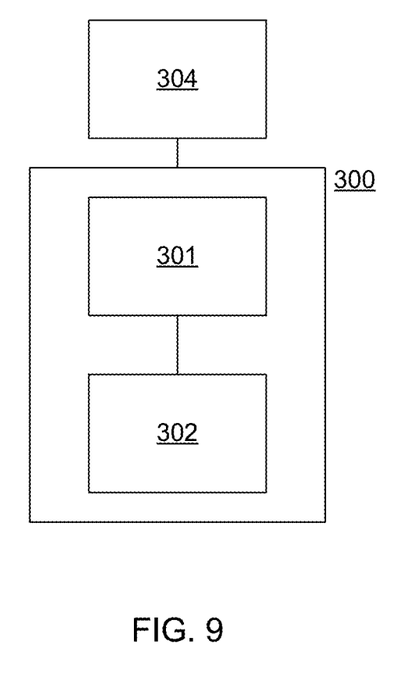
FIG. 9 shows a computer on which one or more embodiments may be implemented.

FIG. 9 shows a computer 300 on which one or more embodiments described above may be implemented. A processor 301 is coupled with memory/storage 302 and a display 304. Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device of generating a reconstruction image, the computing device comprising storage and a processor, the method comprising:

accessing, by the processor, a guide image stored in the storage and a set of target points in the reconstruction image, the target points stored in the storage, the target points having respective target data values, the guide image comprising guide points having respective guide data values;

analyzing, by the processor, guide data values of the guide image to identify a plurality of discontinuity curves in the guide image, wherein indicia of the discontinuity curves are stored in the storage, each discontinuity curve comprising a line of the guide points corresponding to a discontinuity feature in the guide data values points as identified by the analyzing; and after the analyzing, generating, by the processor, the reconstruction image by interpolating values of points in the reconstruction image from the target data values of the target points according to the discontinuity curves, the processor storing the reconstruction image in the storage.

2. A method according to claim 1, further comprising performing the interpolation by adjusting a smoothness measure on the interpolated values, such that the smoothness measure is omitted across the discontinuity curves.

3. A method according to claim 2, wherein the reconstruction image is refined by repeating the interpolating and adjusting for the entire reconstruction image, where each repetition is based on the discontinuity curves.

4. A method according to claim 3, wherein the set of target points correspond to features of a real world subject or scene that are depicted in the guide image.

5. A method according to claim 1, further comprising using the target points to select a subset of the discontinuity curves, and wherein the interpolating is performed with the selected discontinuity curves by adjusting how relaxation is computed near the discontinuity curves.

6. A method according to claim 1, further comprising computing Voronoi boundaries around the target points, where the Voronoi boundaries are then used as candidates for the discontinuity curves.

7. A method according to claim 1, wherein the computing the Voronoi boundaries are obtained according to distances computed according to the data values of the points in the guide image or according to spatial distances in the guide image, or a combination thereof.

8. A method according to claim 7, wherein a distance from an arbitrary guide pixel to a seed point comprises a sum of absolute or squared differences between successive pixels in the path.

9. One or more computer-readable devices storing information to enable a computing device comprising storage and a processor to perform a process of constructing a target image that initially includes a plurality of target pixels each having an initial known value, the process comprising:
   identifying, by the processor, candidate discontinuities in a guide image, stored in the storage, the guide image comprising guide pixels having respective values, each candidate discontinuity comprising a line of guide pixels with an indication thereof stored in the storage, the identifying comprising analyzing the values to identify the discontinuities;
   determining, by the processor, according to the known values of the target pixels, which of the candidate discontinuities to include in a set of the discontinuities; and
   constructing into the storage, by the processor, the target image by computing interpolated values of pixels thereof based on both the known values of the target pixels and based on the set of discontinuities.

10. One or more computer-readable devices according to claim 9, the process further comprising computing regions in the guide image, and using boundaries of the regions as the candidate discontinuities.

11. One or more computer-readable devices according to claim 10, wherein the regions comprise Voronoi regions, and a Voronoi region comprises a region of the guide image computed to include the all of the guide pixels that are respectively closest to a seed pixel in the guide image.

12. One or more computer-readable devices according to claim 11, wherein distances used to find the Voronoi regions are computed from the values of the guide pixels.

13. One or more computer-readable devices according to claim 9, wherein the values of the guide pixels comprise color intensities and the initial known values of target pixels comprise depth values, and the interpolated values comprises interpolated depth values.

14. One or more computer-readable devices according to claim 9, wherein the selecting the set of discontinuities comprises, for a candidate discontinuity, determining whether to select the given candidate discontinuity based on a neighborhood of the given candidate discontinuity.

15. One or more computer-readable media according to claim 14, wherein the neighborhood comprises values of target pixels.

16. One or more computer-readable devices according to claim 14, wherein the given candidate discontinuity comprises a boundary between a first region defined by a first target pixel, and between a second region defined by a second target pixel.

17. One or more computer-readable devices according to claim 15, the process further comprising determining how values of target pixels vary on each side of the boundary.

18. A method performed by one or more computers, the method comprising:
   receiving a guide image comprising a plurality of guide pixels and receiving target pixels, the guide pixels having locations in the guide image and the target pixels having two-dimensional locations in a target image to be reconstructed, the guide pixels comprising or derived from photographic image data of a real world scene, and the target pixels having initial values that correspond to the real world scene;
   using the target pixels to identify discontinuities in the guide image, each discontinuity comprising a line of pixels at a discontinuity identified in the guide image; and
   using the discontinuities to inform an interpolation process that reconstructs the target image by interpolating values from the initial values of the target pixels.

19. A method according to claim 18, wherein when neighboring target pixels are separated by a discontinuity, the interpolation process interpolates from those target pixels to the discontinuity but not across the discontinuity, and when neighboring target pixels are not separated by a discontinuity, the interpolation process interpolates smoothly between those neighboring target pixels.

20. A method according to claim 18, further comprising using only a selected subset of the discontinuities when performing the interpolation process, the discontinuities in the subset having been selected according to the target pixels.

* * * * *